UNITED STATES PATENT OFFICE.

MAX GLASS, OF VIENNA, AUSTRIA-HUNGARY.

PROCESS FOR BRIQUETING FINES OF ORE, FURNACE-DUST, WASTE METAL, WASTE IRON, &c.

958,701. Specification of Letters Patent. Patented May 17, 1910.

No Drawing. Original application filed December 11, 1909, Serial No. 532,603. Divided and this application filed April 1, 1910. Serial No. 552,930.

*To all whom it may concern:*

Be it known that I, MAX GLASS, a subject of the Emperor of Austria-Hungary, residing at 176 Hadikgasse, Vienna, Austria-Hungary, have invented certain new and useful Improvements in Processes of Briqueting Fines of Ore, Furnace-Dust, Waste Metal, Waste Iron, and Like Materials; and I do hereby declare the following to be a full, clear, and exact description of the invention.

The present application is a division of my application Serial No. 532,603, filed December 11, 1909.

The subject-matter of my invention is an improved process of briqueting fines of ore, furnace-dust, waste metal, waste iron and like materials, such as smelting-products, ores in pieces or in granular or powdered condition as well as waste material containing iron, and consists in adding to the material solutions as binding agent, whose basic salts enable the material to be briqueted owing to the product maintaining its consistency sufficiently long under the action of the blast and of the heat of the smelting-furnace. Processes known heretofore for obtaining such briquets were too troublesome and expensive, as the material first had to be carbonized with organic binding agents or the briqueting operation itself had to take place in heat. Now according to my invention these basic salts which enable the material to be bound can be incorporated in the mass to be briqueted by introducing into the same salts which when treated in the mass, possibly with the coöperation of the basic material "lime," form insoluble compounds as binding means, the lime being also able to coöperate simultaneously in removing excess of moisture.

The subject-matter of my invention and the mode of carrying it into practice will now be described with reference to the following example: To this end, calcium acetate and aluminium sulfate can be employed with an admixture of solid, powdered quicklime, it being possible to add to the mass borax in addition when iron or like material is to be protected from rusting. After being mixed the material is subjected to pressure in a press and subsequently, if necessary to a temperature of about 100° C.

For carrying my process into practice the sorted and the mixed material is mixed with the binding admixtures, one liter of the binding agent being mixed with every hundred kilograms of material to be briqueted. When the substances are mixed in this proportion all the particles which are to be briqueted together are moistened and wetted precisely completely, so that the maximum useful material is contained in the briquet, whereas only so much of the binding agent which is produced is present that all the particles are held together with just the necessary strength.

According to its nature in each case the product is subsequently pressed. When employing calcium acetate and aluminium sulfate the insoluble precipitate does not form at once. When the solutions meet perfectly soluble aluminium acetate is first formed while cold and uniformly wets the briquet material. Owing to the subsequent heating to 100° C. which is effectively aided by the presence of the quicklime when the same is slaked, gypsum and acetate of aluminium are separated, the colloidal nature of the precipitate and its glue-like consistence effectively aiding the process. The acetic acid liberated during the conversion and the water are likewise taken up by the caustic lime in consequence of its relationship to lime and aids the heating. The following chemical process then first takes place:

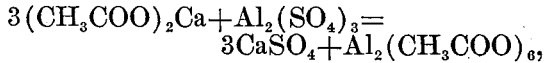
$$3(CH_3COO)_2Ca + Al_2(SO_4)_3 = 3CaSO_4 + Al_2(CH_3COO)_6,$$

whereupon the soluble acetate of aluminium is converted by the heat of absorption produced into an insoluble basic salt which has a binding action on the individual particles of metal. This takes place according to the following formula:

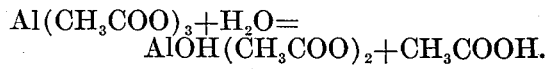
$$Al(CH_3COO)_3 + H_2O = AlOH(CH_3COO)_2 + CH_3COOH.$$

The acetic acid liberated during the process is bound, during the further development of heat, by the quicklime present in excess, while the heat generated serves for continuing the process, i. e. forming basic aluminium acetate. The acetate of lime which is formed acts, on the aluminium sulfate present in excess and the above described binding process continues until all the liberated acetic acid is bound. Therefore the reactions taking place during the process may be comprised in the following equation:

$$3\,Ca(CH_3COO)_2 + CaO + H_2O + Al_2(SO_4)_3 = 2AlOH(CH_3COO)_2 + 3CaSO_4 + Ca(CH_3COO)_2.$$

The reagents necessary for my process may be manufactured as follows:

1. 28 grs. quicklime are mixed with 60 grs. acetic acid, the acetic acid being added to the lime until blue litmus shows a slight excess of acetic acid owing to assuming a slightly reddish coloration. The product obtained is then diluted with one liter of water.

2. 60 grs. aluminium sulfate are dissolved in one liter water and 50 to 60 grs. powdered lime are added to this solution.

If the material to be briqueted, e. g., iron or steel, is to be protected from oxidation owing to moisture, borax is added. To this end, 40 to 50 grs. borax are dissolved in one liter of water. If it is a matter of treating materials in which rusting cannot occur or in which rusting does not matter, e. g., waste iron which is to be smelted down again, the admixture of borax is superfluous.

If the material to be briqueted is soiled and highly rusted, the quantity of the binding agent must be increased up to twice the stated quantity.

I claim:

1. The hereindescribed process of briqueting ore, which consists in uniformly moistening the material to be briqueted with an aqueous solution of calcium acetate and aluminium sulfate, adding quicklime thereto, and heating the mass thus obtained to a temperature of approximately one hundred degrees centigrade, whereby the calcium acetate is converted into basic aluminium acetate which serves as a binder, substantially as described.

2. The hereindescribed process of briqueting ore, which consists in uniformly moistening the material to be briqueted with an aqueous solution of calcium acetate and aluminium sulfate, adding quicklime and borax thereto, pressing the mass thus obtained, and heating the mass to a temperature of approximately 100° C.

3. A briquet having its particles held together by a cementitious compound insoluble in water comprising basic salt of aluminium together with borax to prevent oxidation, substantially as described.

In testimony whereof I have signed my name to this specification, in the presence of two subscribing witnesses.

MAX GLASS.

Witnesses:
AUGUST FUGGER,
ADA MARIA BERGER.